United States Patent
Petterson et al.

(10) Patent No.: US 9,264,660 B1
(45) Date of Patent: Feb. 16, 2016

(54) PRESENTER CONTROL DURING A VIDEO CONFERENCE

(75) Inventors: Frank Petterson, Redwood City, CA (US); Janahan Vivekanandan, Los Altos, CA (US); Thor Carpenter, Snoqualmie, WA (US)

(73) Assignee: Google Inc., Mountain View, CA (US)

( * ) Notice: Subject to any disclaimer, the term of this patent is extended or adjusted under 35 U.S.C. 154(b) by 134 days.

(21) Appl. No.: 13/436,220

(22) Filed: Mar. 30, 2012

(51) Int. Cl.
| | |
|---|---|
| H04N 7/14 | (2006.01) |
| H04L 12/18 | (2006.01) |
| H04N 7/15 | (2006.01) |
| G06Q 10/10 | (2012.01) |
| G06F 3/0481 | (2013.01) |

(52) U.S. Cl.
CPC .............. *H04N 7/141* (2013.01); *G06F 3/0481* (2013.01); *G06Q 10/109* (2013.01); *H04L 12/1827* (2013.01); *H04N 7/152* (2013.01)

(58) Field of Classification Search
CPC .... H04L 12/1827; H04N 7/152; H04N 7/141; G06Q 10/109; G06F 3/0481
USPC ..................... 715/756, 863; 348/14.09, 14.02
See application file for complete search history.

(56) References Cited

U.S. PATENT DOCUMENTS

| | | | |
|---|---|---|---|
| 7,665,041 B2 | 2/2010 | Wilson et al. | |
| 8,065,345 B2 | 11/2011 | Robertson et al. | |
| 8,300,081 B1 * | 10/2012 | Sawyer | 348/14.08 |
| 8,522,308 B2 * | 8/2013 | Stinson, III | 726/2 |
| 2002/0101505 A1 * | 8/2002 | Gutta et al. | 348/14.07 |
| 2008/0037875 A1 * | 2/2008 | Kim et al. | 382/199 |
| 2008/0180519 A1 * | 7/2008 | Cok | 348/14.02 |
| 2010/0185949 A1 | 7/2010 | Jaeger | |
| 2010/0269072 A1 | 10/2010 | Sakata et al. | |
| 2010/0281436 A1 * | 11/2010 | Kipman et al. | 715/863 |
| 2011/0043602 A1 * | 2/2011 | Lee | 348/14.09 |
| 2011/0154266 A1 | 6/2011 | Friend et al. | |
| 2012/0068876 A1 * | 3/2012 | Bangera et al. | 342/27 |
| 2013/0039483 A1 * | 2/2013 | Wolfeld et al. | 379/265.03 |

* cited by examiner

*Primary Examiner* — Patrick Riegler
*Assistant Examiner* — Mong-Shune Chung
(74) *Attorney, Agent, or Firm* — IP Spring

(57) ABSTRACT

Embodiments generally relate to presenter control during a video conference. In one embodiment, a method includes providing a user interface of a video conference between at least a first user and a second user, where the user interface displays a first user video stream in a current presenter position and displays a second user video stream in a secondary presenter position. The method also includes detecting at least one gesture from the second user, where the detecting of the at least one gesture indicates that the second user intends to be a current presenter. The method also includes causing the user interface to display the second user video stream in the current presenter position and to display the first user video stream in the secondary presenter position in response to the detecting.

18 Claims, 6 Drawing Sheets

PRESENTER CONTROL DURING A VIDEO CONFERENCE

TECHNICAL FIELD

Embodiments relate generally to video conferencing and more particularly to presenter control during a video conference.

BACKGROUND

Video conferencing is often used in business settings, and enables participants to share video and audio content with each other in real-time across geographically dispersed locations. A communication device at each location typically uses a video camera and microphone to send video and audio streams, and uses a video monitor and speaker to play received video and audio streams, which are transmitted in real-time across a network from one location to another. Video conferencing simulates real-time, in-person meetings by enabling participants to see and hear each other during a video conference.

SUMMARY

Embodiments generally relate to presenter control during a video conference. In one embodiment, a method includes providing a user interface of a video conference between at least a first user and a second user, where the user interface displays a first user video stream in a current presenter position and displays a second user video stream in a secondary presenter position. The method also includes detecting at least one gesture from the second user, where the detecting of the at least one gesture indicates that the second user intends to be a current presenter. The method also includes causing the user interface to display the second user video stream in the current presenter position and to display the first user video stream in the secondary presenter position in response to the detecting.

In one embodiment, the at least one gesture is a predefined gesture that indicates that the second user intends to be the current presenter. In one embodiment, the at least one gesture is a hand wave. In one embodiment, the at least one gesture is subset of a predetermined sign language. In one embodiment, the at least one gesture is subset of American Sign Language. In one embodiment, the method includes determining a first heuristic value associated with one or more gestures from the first user; determining a second heuristic value associated with one or more gestures from the second user; and comparing the first heuristic value with the second heuristic value, where the causing of the user interface to display the second user video stream in the current presenter position and to display the first user video stream in the secondary presenter position is in response to the second heuristic value being greater than the first heuristic value.

In one embodiment, the causing of the user interface to display the second user video stream in the current presenter position and to display the first user video stream in the secondary presenter position is in response to a detection of the least one gesture and a detection of voice. In one embodiment, the method further includes detecting at least one predefined key stroke, where the causing of the user interface to display the second user video stream in the current presenter position and to display the first user video stream in secondary presenter position is in response to the detecting of the at least one predefined key stroke. In one embodiment, the user interface displays the second user video stream in the current presenter position until at least one subsequent gesture from the first user is detected. In one embodiment, the user interface displays the second user video stream in the current presenter position for at least a predefined time period.

In another embodiment, a method includes providing a user interface of a video conference between at least a first user and a second user, where the user interface displays a first user video stream in a current presenter position and displays a second user video stream in a secondary presenter position. The method also includes detecting at least one gesture from the second user, where the detecting of the at least one gesture indicates that the second user intends to be a current presenter, where the at least one gesture is a predefined gesture that indicates that the second user intends to be the current presenter, and where the at least one gesture is subset of a predetermined sign language. The method also includes determining a first heuristic value associated with one or more gestures from the first user; determining a second heuristic value associated with one or more gestures from the second user; comparing the first heuristic value with the second heuristic value; and causing the user interface to display the second user video stream in the current presenter position and to display the first user video stream in the secondary presenter position in response to the second heuristic value being greater than the first heuristic value, and where the user interface displays the second user video stream in the current presenter position until at least one subsequent gesture from the first user is detected.

In another embodiment, a system includes one or more processors; and logic encoded in one or more tangible media for execution by the one or more processors. The logic when executed is operable to perform operations including providing a user interface of a video conference between at least a first user and a second user, where the user interface displays a first user video stream in a current presenter position and displays a second user video stream in a secondary presenter position. The logic when executed is operable to perform operations including detecting at least one gesture from the second user, where the detecting of the at least one gesture indicates that the second user intends to be a current presenter; and causing the user interface to display the second user video stream in the current presenter position and to display the first user video stream in the secondary presenter position in response to the detecting.

In one embodiment, with further regard to the system, the at least one gesture is a predefined gesture that indicates that the second user intends to be the current presenter. In one embodiment, the at least one gesture is a hand wave. In one embodiment, the at least one gesture is subset of a predetermined sign language. In one embodiment, the at least one gesture is subset of American Sign Language. In one embodiment, the logic when executed is further operable to perform operations including determining a first heuristic value associated with one or more gestures from the first user; determining a second heuristic value associated with one or more gestures from the second user; and comparing the first heuristic value with the second heuristic value, where the causing of the user interface to display the second user video stream in the current presenter position and to display the first user video stream in the secondary presenter position is in response to the second heuristic value being greater than the first heuristic value.

In one embodiment, with further regard to the system, the causing of the user interface to display the second user video stream in the current presenter position and to display the first user video stream in the secondary presenter position is in response to a detection of the least one gesture and a detection of voice. In one embodiment, the logic when executed is further operable to perform operations comprising detecting at least one predefined key stroke, where the causing of the user interface to display the second user video stream in the current presenter position and to display the first user video stream in secondary presenter position is in response to the detecting of the at least one predefined key stroke. In one embodiment, the user interface displays the second user video stream in the current presenter position until at least one subsequent gesture from the first user is detected.

DETAILED DESCRIPTION

Embodiments described herein improve user engagement in a social network by enabling a broader range of communication modes among participants in a multi-user video conference. In one embodiment, the system displays a video stream of a user who is currently presenting in a prominent position in a user interface. For example, the prominent position may be in the center of the user interface. The system also displays one or more video streams of other users who are watching and/or listening to the current presenter in less prominent positions in the user interface. For example, these less prominent positions may be at the bottom of the user interface.

In various embodiments, a system automatically switches the video streams displayed in the prominent position such that the video stream of any user who becomes the current presenter is moved to the prominent position. In one embodiment, the switching may be triggered by visual gestures. For example, if the system detects a gesture of a user who is not the current presenter, the system ensures that the video stream of that user is displayed in the prominent position. The gesture may be any predetermined gesture (e.g., a raising of the hand, a hand wave, etc.) that indicates a desire to be the current presenter.

Embodiments described herein provide various benefits. For example, embodiments described herein also increase overall engagement among users in a social networking environment by enabling a broader range of users to participate in multi-user video conferences. For example, the system enables users who are deaf and/or mute to communication with video without needing voice to communicate. Various example embodiments are described in detail below.

Figure 1:
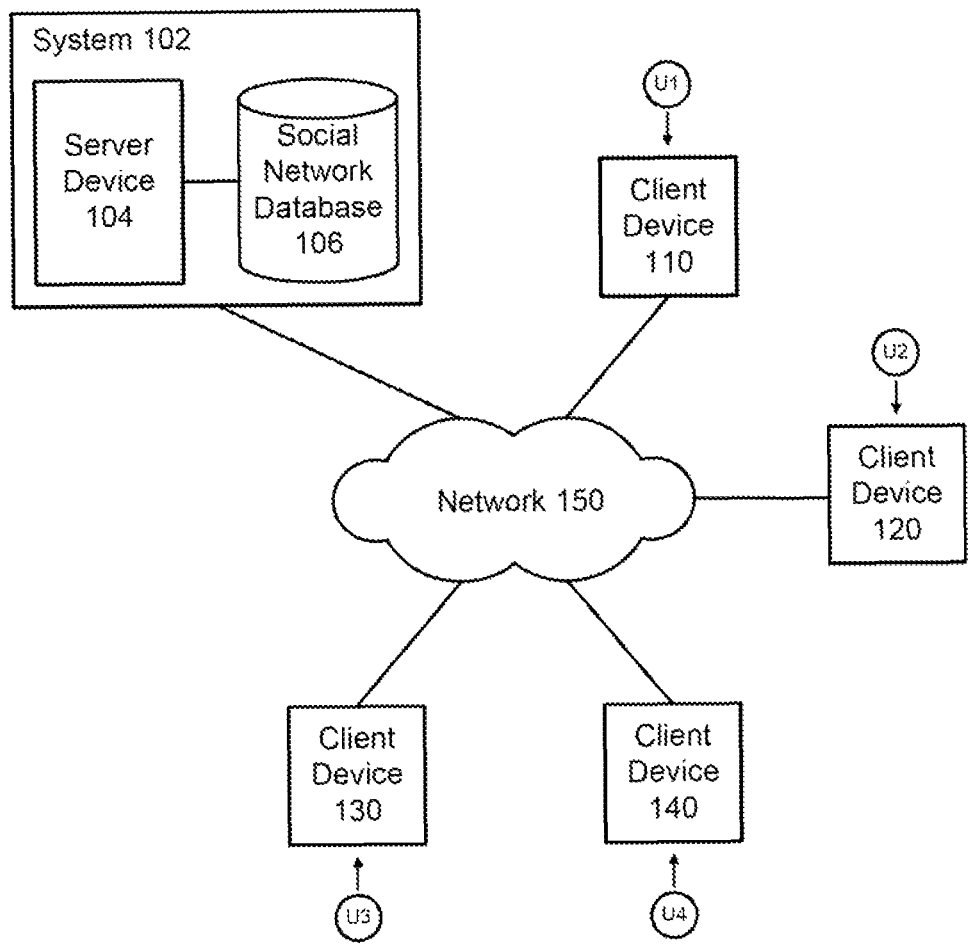
FIG. 1 illustrates a block diagram of an example network environment, which may be used to implement the embodiments described herein.

FIG. 1 illustrates a block diagram of an example network environment 100, which may be used to implement the embodiments described herein. In one embodiment, network environment 100 includes a system 102, which includes a server device 104 and a social network database 106. Network environment 100 also includes client devices 110, 120, 130, and 140, which may communicate with each other via system 102 and a network 150.

For ease of illustration, FIG. 1 shows one block for each of system 102, server device 104, and social network database 106, and shows four blocks for client devices 110, 120, 130, and 140. Blocks 102, 104, and 106 may represent multiple systems, server devices, and social network databases. Also, there may be any number of client devices. In other embodiments, network environment 100 may not have all of the components shown and/or may have other elements including other types of elements instead of, or in addition to, those shown herein.

In various embodiments, users U1, U2, U3, and U4 may communicate with each other using respective client devices 110, 120, 130, and 140. For example, users U1, U2, U3, and U4 may interact with each other in a multi-user video conference, where respective client devices 110, 120, 130, and 140 transmit media streams to each other.

In various embodiments, the media streams may include different types of media streams (e.g., one or more video streams and/or one or more audio streams). For example, such media streams may include video streams that display users U1, U2, U3, and U4, and may include associated audio streams. Also, the media streams may include media streams being transmitted in different directions (e.g., one or more outbound streams and/or one or more inbound streams) relative to each client device 110, 120, 130, and 140. As described in more detail below in connection with FIGS. 2 and 3A and 3B, system 102 may present the media streams to users U1, U2, U3, and U4 in a multi-user video conference in a manner that enhances the experience for users U1, U2, U3, and U4.

Figure 2:
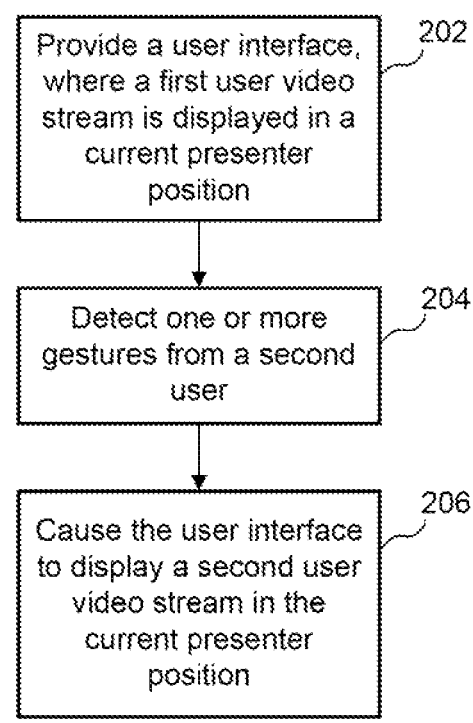
FIG. 2 illustrates an example simplified flow diagram for presenter control during a video conference, according to one embodiment.

FIG. 2 illustrates an example simplified flow diagram for presenter control during a video conference, according to one embodiment. Referring to both FIGS. 1 and 2, a method is initiated in block 202, where system 102 provides a user interface of a video conference between at least a first user and a second user (e.g., users U1 and U2). For ease of illustration, example embodiments are described herein in the context of users U1 and U2. These embodiments also apply to users in addition to users U1 and U2, such as users U3 and U4, etc.

In one embodiment, the user interface displays a first user video stream in a current presenter position and displays a second user video stream in a secondary presenter position.

Figure 3A:
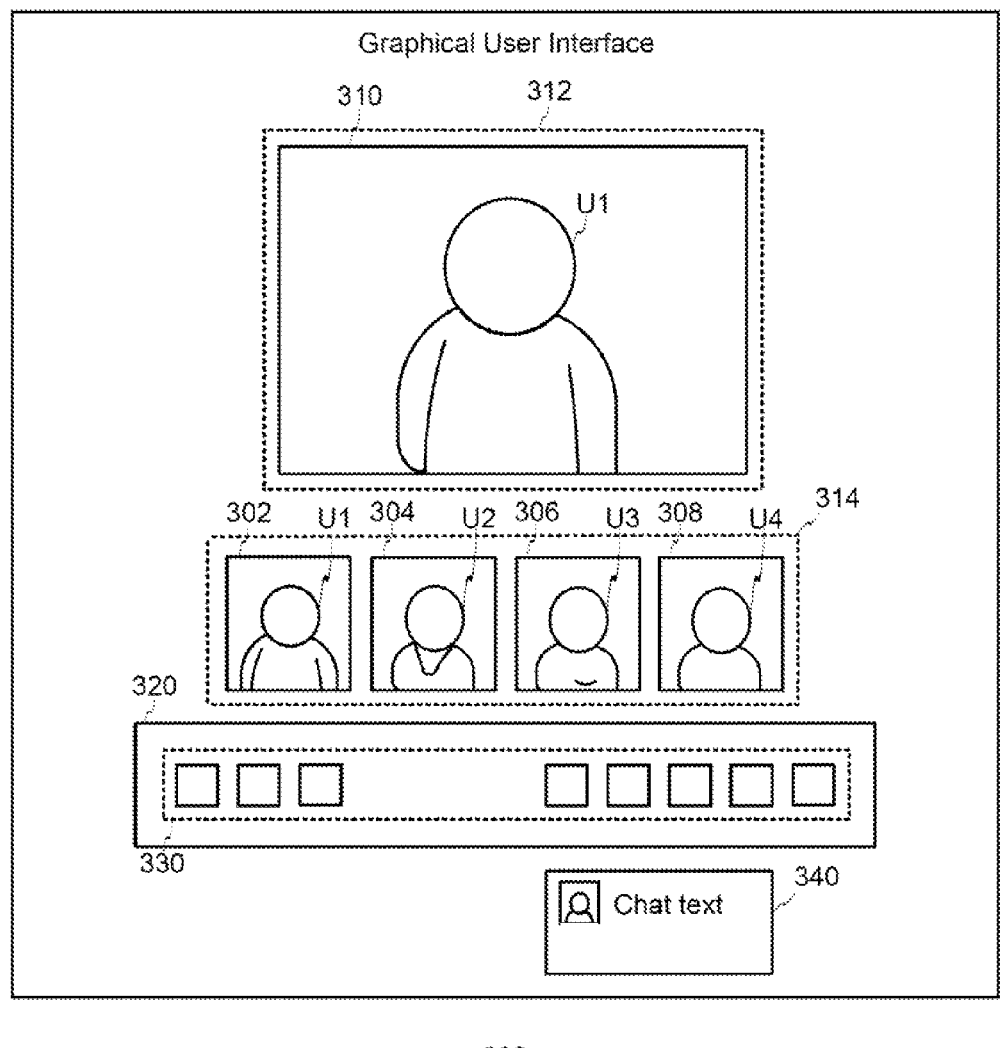
FIG. 3A illustrates an example simplified graphical user interface (GUI), according to one embodiment.

FIG. 3A illustrates an example simplified graphical user interface (GUI) 300, according to one embodiment. As described in more detail below, FIG. 3A shows a video stream associated with a first user (e.g., user U1) that is displayed in a current presenter position 312 and shows a video stream associated with a second user (e.g., user U2) is displayed in a secondary presenter position 314.

In one embodiment, GUI 300 includes video windows 302, 304, 306, and 308, which display video streams of respective users U1, U2, U3, and U4 who are participating in a multi-user video conference. For ease of illustration, four users U1, U2, U3, and U4 are shown. In various implementations, there may any number of users participating in the multi-user video conference (e.g., up to 10 users or more). In various embodiments, system 102 enables users U1, U2, U3, and U4 to communicate by any combination of video, voice, and typed chats.

In one embodiment, GUI 300 includes a main video window 310, which corresponds to "current presenter position" 312. For ease of illustration, main video window 310 (solid-line box) is shown separately from and within current presenter position 312 (dotted-line box). In various embodiments, main video window 310 and current presenter position 312 may directly overlap. In one embodiment, the current presenter position 312 is a prominent position in GUI 300 that indicates that the user shown in that position is the "current presenter." In various embodiments, the current presenter is the user who is communicating to the other users either by voice or gestures (e.g., sign language). In this particular example, main video window 310 is displaying a video stream of user U1, who is the current presenter.

In one embodiment, the video windows 302, 304, 306, and 308 correspond to "secondary presenter position" 314, and show all users including users who are not the current presenter. The series of video windows in secondary presenter position 314 may be referred to as a film strip, in that it shows thumbnails of all users U1, U2, U3, U4, etc. As shown, in one embodiment, the current presenter (e.g., user U1) in the main video window 310 is also shown in one of the video windows (e.g., video window 302) in secondary presenter position 314. For ease of illustration, video windows 302, 304, 306, and 308 (solid-line boxes) are shown separately from and within secondary presenter position 314 (dotted-line box). In various embodiments, each of the video windows 302, 304, 306, and 308 and a corresponding secondary presenter position 314 directly overlap. In one embodiment, the secondary presenter position 314 is in a less prominent position in GUI 300. The second presenter position 314 indicates all users participating in the multi-user video conference, including the current presenter and the other users. In various embodiments, the other users who are not the current presenter are users who are watching or listening to the current presenter. In this particular example, video windows 302, 304, 306, and 308 are displaying a video stream of all users U1, U2, U3, and U4.

In one embodiment, current presenter position 312 and main video window 310 are in a prominent position in GUI 300. Also, main video window 310 is a larger version of the corresponding video window in the secondary present position (e.g., video window 302). In one embodiment, main video window 310 is larger than the other video windows 302, 304, 306, and 308. The combination of main video window 310 being in the present position 312 and being larger than the other videos visually indicates that the user shown in main video window 310 is the current presenter.

In one embodiment, GUI 300 also includes a control window 320, which includes control buttons 330 (enclosed in dotted lines). For ease of illustration, eight control buttons are shown. The number of control buttons may vary depending on the specific implementation. The functionality of control buttons 330 also varies depending on the specific implementation. In one embodiment, one of the control buttons 330 may function to make a particular user the current presenter. As such, the selecting of one of the control buttons 330 may cause the video stream of the user who selected the control button to assume the current presenter position. In one embodiment, GUI 300 also includes a chat window 340 for enabling users U1, U2, U3, and U4 to exchange chat messages with each other during the video conference. In one embodiment, chat window 340 displays a chat log of typed conversations.

Referring still to FIG. 2, in block 204, system 102 detects one or more gestures from the second user (e.g., user U2). In one embodiment, the detecting of the one or more gestures indicates that the second user intends to be a current presenter. In one embodiment, the one or more gestures may include a predefined gesture or may include a predefined set of gestures that indicate that the second user intends to be the current presenter. In one embodiment, the one or more gestures may include a hand wave. In one embodiment, the one or more gestures may include a subset of a predetermined sign language. In one embodiment, the one or more gestures may include a subset of American Sign Language.

In block 206, system 102 causes the user interface to display the second user video stream in the current presenter position and to display the first user video stream in the secondary presenter position in response to the detecting.

Figure 3B:
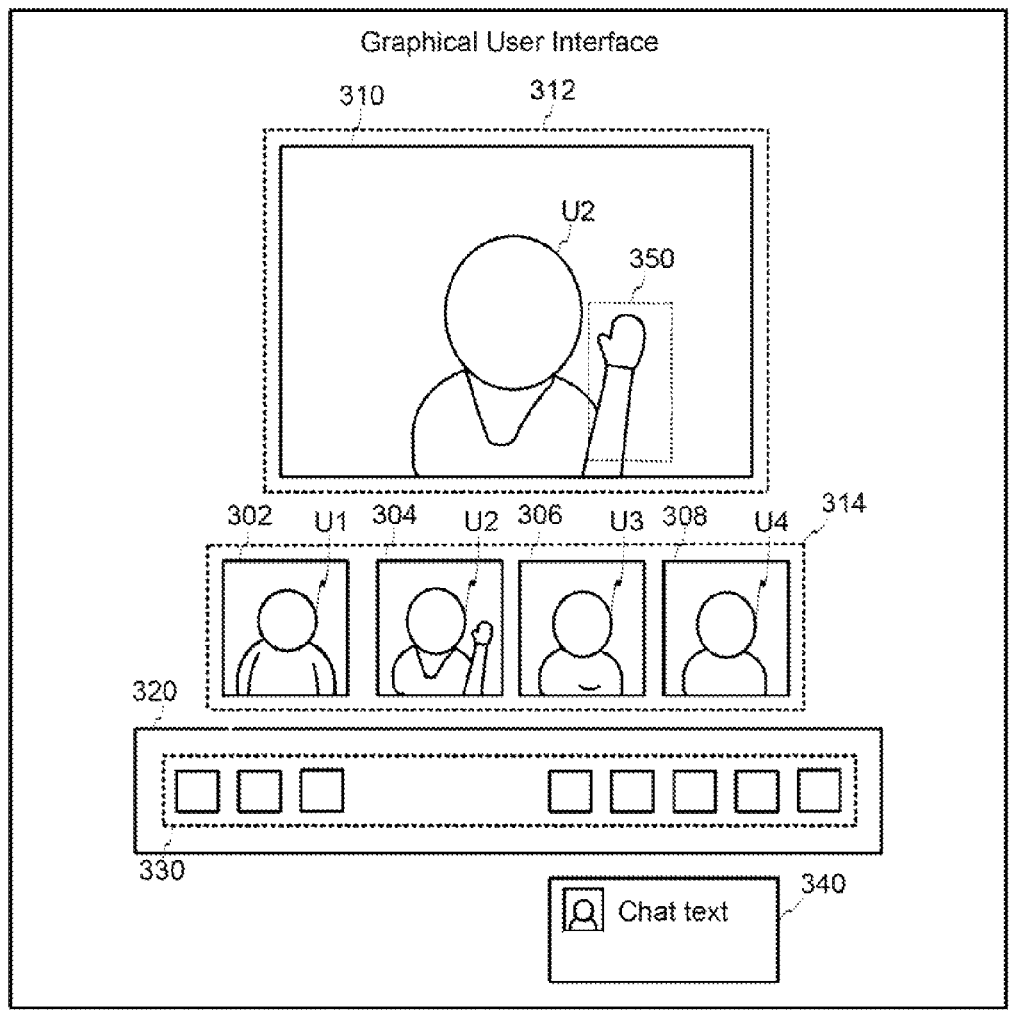
FIG. 3B illustrates the example GUI of FIG. 3A with a different current presenter, according to one embodiment.

FIG. 3B illustrates the example GUI 300 of FIG. 3A with a different current presenter, according to one embodiment. In one embodiment, GUI 300 includes the same elements as those of FIG. 3A. The main difference between FIG. 3A and FIG. 3B is that FIG. 3B shows the video stream associated with the second user (e.g., user U2) being displayed in the current presenter position 312 and shows the video stream associated with the first user (e.g., user U2) being displayed in the secondary presenter position 314 and no longer in the current presenter position 312.

As FIG. 3B shows, user U2 is making a gesture 350. As described above with respect to block 204 of FIG. 2, system 102 detects the gesture, and then causes GUI 300 to display the video stream associated with user U2 in current presenter position 310 and causes GUI 300 to display the video stream associated with user U1 in the secondary presenter position and no longer in current presenter position 310. For ease of illustration, some of these examples embodiments are described in the context of user U2 making the gesture. In various embodiments, other users such as user U3 or user U4, etc. may also make one or more gestures in order to become the current presenter.

In this example, user U2 is making a gesture 350 by raising a hand. In various embodiments, system 102 uses a gesture recognition algorithm that recognizes visual elements in a video stream, and recognizes movements and relative positions of the elements. For example, the gesture recognition algorithm may detect the raising of an arm or more specifically the raising of a hand, and interpret the gesture as an indication that user U2 intends to be the current presenter. In various embodiments, as indicated above, system 102 may detect a predefined gesture, such as a hand wave, or a gesture that is a part of a subset of predetermined sign language gestures such as American Sign Language, etc. As a result, a given user (e.g., user U2) gains the current speaker position by gesturing.

In one embodiment, GUI 300 displays the video stream associated with user U2 in the current presenter position 310 until system 102 detects at least one subsequent gesture from user U1 or any other user (e.g., user U3 or user U4). In one embodiment, system 102 may also switch the video stream displayed in main video window 316 each time a different user speaks. In various embodiments, the current presenter remains the current presenter until the current present makes a predefined gesture that relinquishes the control of the current presenter position. In one embodiment, the current presenter remains the current presenter until the current presenter stops gesturing entirely. In one embodiment, GUI 300 may display the current presenter in main video window 310 for at least a predefined time period (e.g., S seconds).

Although the steps, operations, or computations may be presented in a specific order, the order may be changed in particular embodiments. Other orderings of the steps are possible, depending on the particular implementation. In some particular embodiments, multiple steps shown as sequential in this specification may be performed at the same time.

Figure 4:
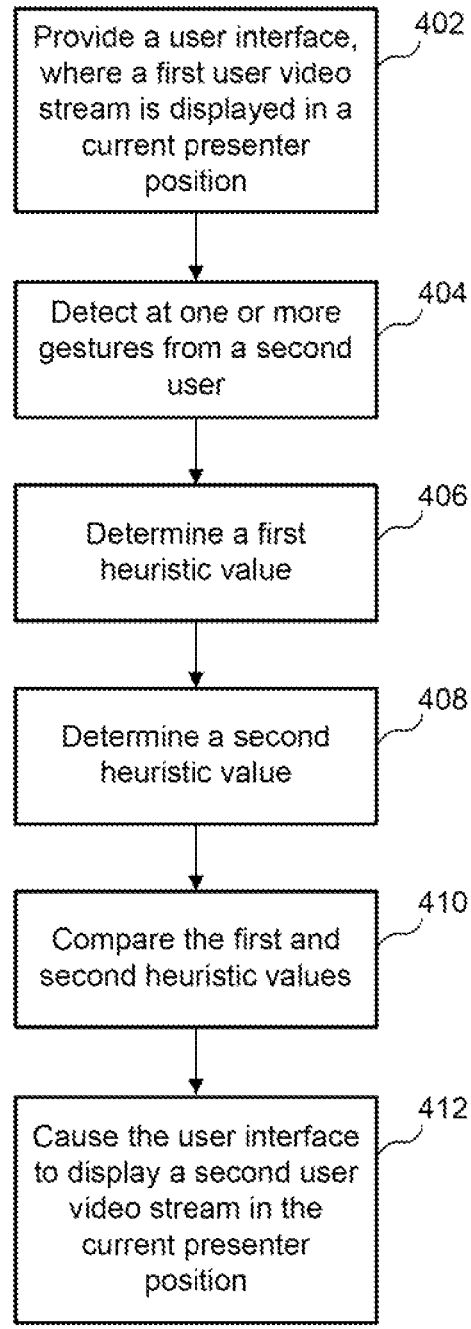
FIG. 4 illustrates an example simplified flow diagram for presenter control during a video conference, according to one embodiment.

FIG. 4 illustrates an example simplified flow diagram for presenter control during a video conference, according to one embodiment. In various embodiments, a method is initiated in block 402, where system 102 provides a user interface of a video conference between at least a first user and a second user. In one embodiment, the user interface displays a first user video stream in a current presenter position and displays a second user video stream in a secondary presenter position.

In block 404, system 102 detects one or more gestures from the second user. In one embodiment, the detecting of the one or more gestures indicates that the second user intends to be a current presenter. Embodiments described above with regard to block 204 of FIG. 2 above also apply to block 404 of FIG. 3.

In block 406, system 102 determines a first heuristic value associated with one or more gestures from the first user. In one embodiment, the heuristic value may be based on one or more gesture aspects such as movement, duration of movement, and relative locations of visual elements (e.g., hands, fingers, etc.). For example, system 102 may detect movement of a given user who is not the current presenter. In one embodiment, system 102 may determine a magnitude of the movement (e.g., a hand moving across the screen by a particular distance or percentage of the screen. System 102 may determine a duration of continuous movement (e.g., a hand waving for a particular time period). In one embodiment, system 102 may determine an average amount of movement based on these factors (e.g., magnitude of movement, duration of continuous movement, etc.). In one embodiment, system 102 may assign a heuristic value based on an average amount of movement over a predetermined duration (e.g., average movement over the last 10 seconds). In one embodiment, average amount of movement incorporates pauses in movement. In various scenarios, it would be expected to have varying pauses in movement sound due to the current presenter pausing to think, for example.

In block 408, system 102 determines a second heuristic value associated with one or more gestures from the second user. Embodiments described above with regard to block 406 also apply to block 408, except that the embodiments described apply to one or more gestures of the second user. In one embodiment, with regard to blocks 406 and 408, each heuristic value is determined by system 102. In another embodiment, each heuristic value may be determined by system 102 after receiving heuristic information from other systems associated with other users.

In block 410, system 102 compares the first heuristic value with the second heuristic value. In block 412, system 102 causes the user interface to display the second user video stream in the current presenter position, and to display the first user video stream in the secondary presenter position in response to the second heuristic value being greater than the first heuristic value.

In various embodiments, the switching may be triggered by voice. For example, if the system detects the voice of a given user, the system ensures that the video stream of that user is displayed in the prominent position. Accordingly, in one embodiment, system 102 may determine a third heuristic value associated with the voice of a given presenter.

In one embodiment, the heuristic value may be based on one or more voice aspects such as volume and duration. For example, system 102 may detect an increase in the volume of the voice of a user who is not the current presenter. If the volume increases above a predefined threshold and remains above the predefined threshold longer than a predefined duration, system 102 may assign a heuristic value based on an average volume over a predetermined duration (e.g., average volume over the last 10 seconds). In one embodiment, average volume incorporates pauses in audio sound. In various scenarios, it would be expected to have varying pauses in audio sound due to the current presenter pausing to think, for example.

In one embodiment, system 102 may then compare the heuristic value against that of the current presenter to determine whether to switch the current presenter to a new user. In one embodiment, system 102 may aggregate heuristic values associated with voice and gestures of a given user and comparing the aggregate heuristic value to an aggregate heuristic value associated with another user. In other words, system 102 may cause the user interface to display the second user video stream in the current presenter position and to display the first user video stream in the secondary presenter position and no longer in the current presenter position in response to the detection of a gesture and/or voice.

In various embodiments, system 102 compares heuristic values (or aggregate heuristic values) associated with different users in order to determine which user becomes the current presenter at any given moment.

In one embodiment, system 102 detects at least one predefined key stroke, which causes of the user interface to display the second user video stream in the current presenter position and to display the first user video stream in secondary presenter position. In one embodiment, GUI 300 may display current presenter in main video window 310 for at least a predefined time period (e.g., S seconds).

Although the steps, operations, or computations may be presented in a specific order, the order may be changed in particular embodiments. Other orderings of the steps are possible, depending on the particular implementation. In some particular embodiments, multiple steps shown as sequential in this specification may be performed at the same time.

Embodiments described herein provide various benefits. For example, embodiments described herein also increase overall engagement among users in a social networking environment by enabling a broader range of users to participate in multi-user video conferences. For example, the system enables users who are deaf and/or mute to communication with video without needing voice to communicate.

Figure 5:
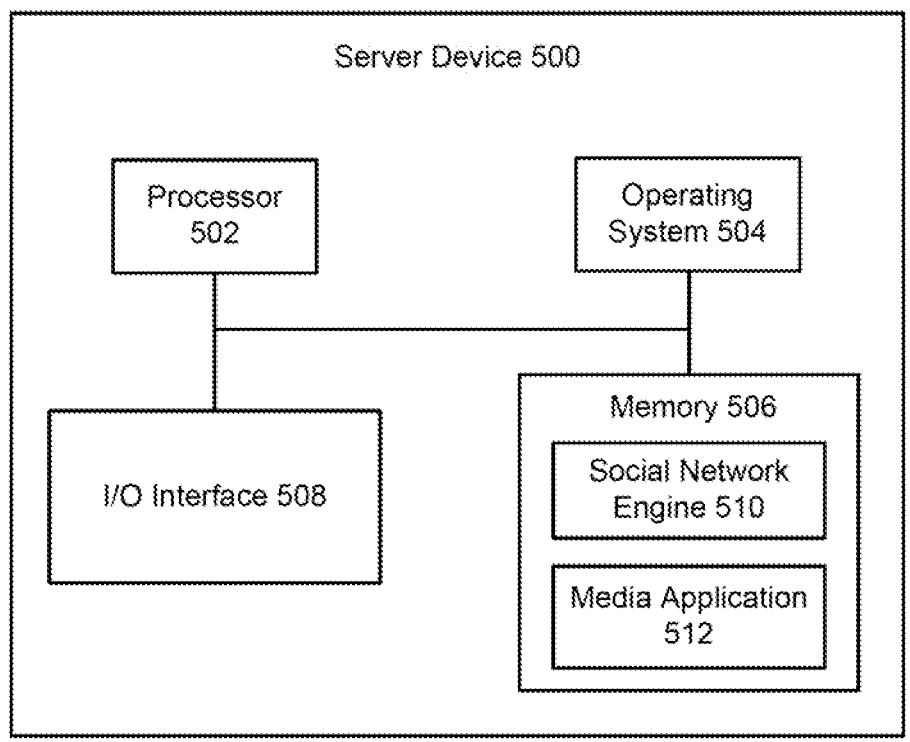
FIG. 5 illustrates a block diagram of an example server device, which may be used to implement the embodiments described herein.

FIG. 5 illustrates a block diagram of an example server device 500, which may be used to implement the embodiments described herein. For example, server device 500 may be used to implement server device 104 of FIG. 1, as well as to perform the method embodiments described herein. In one embodiment, server device 500 includes a processor 502, an operating system 504, a memory 506, and an input/output (I/O) interface 508. Server device 500 also includes a social network engine 510 and a media application 512, which may be stored in memory 506 or on any other suitable storage location or computer-readable medium. Media application 512 provides instructions that enable processor 502 to perform the functions described herein and other functions.

For ease of illustration, FIG. 5 shows one block for each of processor 502, operating system 504, memory 506, I/O interface 508, social network engine 510, and media application 512. These blocks 502, 504, 506, 508, 510, and 512 may represent multiple processors, operating systems, memories, I/O interfaces, social network engines, and media applications. In other embodiments, server device 500 may not have all of the components shown and/or may have other elements including other types of elements instead of, or in addition to, those shown herein.

Although the description has been described with respect to particular embodiments thereof, these particular embodiments are merely illustrative, and not restrictive. Concepts illustrated in the examples may be applied to other examples and embodiments.

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

What is claimed is:

1. A method comprising:
   providing a user interface of a video conference between at least a first user and a second user, wherein the user interface displays a first user video stream in a current presenter position and displays a second user video stream in a secondary presenter position;
   detecting a first hand movement from the first user;
   detecting a second hand movement of the second user that indicates that the second user intends to be a current presenter, wherein the second hand movement corresponds to sign language;
   determining a first average amount of movement associated with the first hand movement from the first user based on a first magnitude of the first hand movement across a predetermined distance of the first user video stream;
   assigning a first heuristic value based on the first average amount of movement;
   determining a second average amount of movement associated with the second hand movement from the second user based on a second magnitude of the second hand movement across the predetermined distance of the second user video stream;
   assigning a second heuristic value based on the second average amount of movement;
   comparing the first heuristic value with the second heuristic value; and causing the user interface to display the second user video stream in the current presenter position and to display the first user video stream in the secondary presenter position in response to the second heuristic value being greater than the first heuristic value.

2. A method comprising:
   providing a user interface of a video conference between at least a first user and a second user, wherein the user interface displays a first user video stream in a current presenter position and displays a second user video stream in a secondary presenter position;
   detecting at least one gesture from the second user, wherein the at least one gesture is a limb movement, wherein the detecting of the at least one gesture indicates that the second user intends to be a current presenter;
   determining an average amount of movement associated with the at least one gesture from the second user based on a magnitude of the limb movement across a predetermined percentage of a display of the video conference;
   assigning a heuristic value based on the average amount of movement; and causing the user interface to display the second user video stream in the current presenter position and to display the first user video stream in the secondary presenter position based on the heuristic value meeting a predetermined threshold value.

3. The method of claim 2, further comprising:
   detecting an increase in volume from the first user;
   determining that the increase in volume indicates that the first user wants to be the current presenter; and
   causing the user interface to display the first user video stream in the current presenter position and to display the second user video stream in the secondary presenter position based on the heuristic value.

4. The method of claim 2, wherein the at least one gesture is a subset of American Sign Language.

5. The method of claim 2, wherein the average amount of movement incorporates pauses in the limb movement.

6. The method of claim 2, wherein the causing of the user interface to display the second user video stream in the current presenter position and to display the first user video stream in the secondary presenter position is in response to a detection of the at least one gesture and a detection of voice.

7. The method of claim 2, further comprising detecting at least one predefined key stroke, wherein the causing of the user interface to display the second user video stream in the current presenter position and to display the first user video stream in secondary presenter position is in response to the detecting of the at least one predefined key stroke.

8. The method of claim 2, wherein the user interface displays the second user video stream in the current presenter position until at least one subsequent gesture from a different user is detected such that the at least one subsequent gesture indicates that the different user intends to be the current presenter.

9. The method of claim 2, wherein the user interface displays the second user video stream in the current presenter position for at least a predefined time period.

10. A system comprising:
    one or more processors; and
    logic encoded in one or more tangible media for execution by the one or more processors and when executed operable to perform operations comprising:
    providing a user interface of a video conference between at least a first user and a second user, wherein the user interface displays a first user video stream in a current presenter position and displays a second user video stream in a secondary presenter position;
    detecting at least one gesture from the second user, wherein the at least one gesture is a limb movement, wherein the at least one gesture is a predefined gesture that indicates that the second user intends to be a current presenter;

determining an average amount of movement associated with the at least one gesture from the second user based on a magnitude of the limb movement across a predetermined percentage of a display of the video conference;

assigning a heuristic value based on the average amount of movement; and causing the user interface to display the second user video stream in the current presenter position and to display the first user video stream in the secondary presenter position based on the heuristic value meeting a predetermined threshold value.

11. The system of claim 10, wherein the at least one gesture is a predefined gesture that indicates that the second user intends to be the current presenter.

12. The system of claim 10, wherein the at least one gesture is a hand wave.

13. The system of claim 10, wherein the at least one gesture corresponds to a predetermined sign language.

14. The system of claim 10, wherein the at least one gesture corresponds to American Sign Language.

15. The system of claim 10, wherein the logic when executed is further operable to perform:
   detecting an increase in volume from the first user;
   determining that the increase in volume indicates that the first user wants to be the current presenter; and
   causing the user interface to display the first user video stream in the current presenter position and to display the second user video stream in the secondary presenter position based on the heuristic value.

16. The system of claim 10, wherein the causing of the user interface to display the second user video stream in the current presenter position and to display the first user video stream in the secondary presenter position is in response to a detection of the at least one gesture and a detection of voice.

17. The system of claim 10, wherein the logic when executed is further operable to perform operations comprising detecting at least one predefined key stroke, wherein the causing of the user interface to display the second user video stream in the current presenter position and to display the first user video stream in secondary presenter position is in response to the detecting of the at least one predefined key stroke.

18. The system of claim 10, wherein the user interface displays the second user video stream in the current presenter position until at least one subsequent gesture from a different user is detected such that the at least one subsequent gesture indicates that the different user intends to be the current presenter.

* * * * *